United States Patent [19]

Lapp et al.

[11] E Re. 31,210

[45] Reissued Apr. 19, 1983

[54] APPARATUS AND METHOD FOR FEEDING AND COLLECTING CONTINUOUS WEB MATERIAL

[75] Inventors: James F. Lapp, Richmond, Va.; Thomas F. McGrath, Tinley Park, Ill.

[73] Assignee: Acme Visible Records, Inc., Crozet, Va.

[21] Appl. No.: 329,944

[22] Filed: Dec. 11, 1981

Related U.S. Patent Documents

Reissue of:

[64] Patent No.: 4,256,248
Issued: Mar. 17, 1981
Appl. No.: 90,585
Filed: Nov. 2, 1979

[51] Int. Cl.[3] ..... B65H 19/42; B65H 23/32; B65H 19/18

[52] U.S. Cl. ..... 226/119; 226/197; 242/58.1; 355/14 R

[58] Field of Search ..... 226/117, 118, 119, 120, 226/197; 270/39; 281/5; 282/11.5; 355/14 R; 242/58.1

[56] References Cited

U.S. PATENT DOCUMENTS

| | | | |
|---|---|---|---|
| 2,446,400 | 8/1948 | Woolley | 281/5 |
| 3,548,783 | 12/1970 | Knapp | 226/197 |
| 3,586,437 | 6/1971 | Dietz | 355/14 R |
| 3,631,972 | 1/1972 | Hudson | 270/39 |
| 3,954,213 | 5/1976 | Andersen | 226/197 |

*Primary Examiner*—Edward J. McCarthy
*Attorney, Agent, or Firm*—Pennie & Edmonds

[57] ABSTRACT

An apparatus and method for feeding a series of web portions to a high speed web processing machine, such as a high speed printer, utilizing auxiliary equipment positioned adjacent the processing machine. The auxiliary equipment permits continuous splicing of web portions and, thus feeding of a continuous web to the processing machine, and intermittent removal of web portions in such a manner that the processing machine may be run continuously without stoppage for feeding or removing the web.

12 Claims, 7 Drawing Figures

APPARATUS AND METHOD FOR FEEDING AND COLLECTING CONTINUOUS WEB MATERIAL

Matter enclosed in heavy brackets [ ] appears in the original patent but forms no part of this reissue specification; matter printed in italics indicates the additions made by reissue.

BACKGROUND ART

Feeding paper to high speed printers or other machines which continuously process paper or other web materials at high speeds has been accomplished by supplying a continuous web of material to the printer or processing machine and providing means for continuous removing and collecting the processed web. Some such machines are so constructed and operated to permit continuous feeding and removal of the web with no down-time required to perform paper handling tasks (see U.S. Pat. Nos. 3,586,437 and 3,631,972).

However, some high speed printers being operated today are not capable of being fed a continuous web of paper but instead are normally operated by supplying a stack of folded web sheets, running the printer to process the stack and then stopping the printer to take out the processed stack. This sequence is then repeated. Such high speed printers have paper feed apertures and discharge apertures positioned in recesses within the machine which make continuous feeding and removal impossible. The IBM 3800 printer is an example of such a machine.

Prior web feeding and removal equipment cannot satisfactorily provide such high speed printers with the quantities of web material they are capable of processing. For this reason prior feeding equipment and techniques cannot provide continuous operating of such processing machines.

SUMMARY OF THE INVENTION

Broadly, the present invention is a method and apparatus for feeding web portions to and removing them from a web processing machine which receives the web in a recessed area and discharges the web in stacked form. Web portions are packed in containers with web ends protruding and the containers tandemly aligned [along side] *alongside* the processing machine for splicing. This spliced web is continuously fed to the recess of the machine by changing the direction of the path of the web, as spliced, by employing an arrangement of rollers, turn bars and guides. Removal of portions of the discharge stack is accomplished through temporarily supporting an upper portion of the stack while detaching and removing a lower portion.

It is a feature of the invention that the web portions in spliced form can be fed to the processing machine at a sufficient rate so that the machine need not be shut down due to insufficient feed.

It is also a feature of the invention that web removal is accomplished with sufficient speed such that the interruption of machine processing is minimal during web removal.

It is a further feature of the apparatus of the invention that it is light weight, portable and is highly reliable in operation.

BRIEF DESCRIPTION OF THE PREFERRED EMBODIMENT

Figure 1:
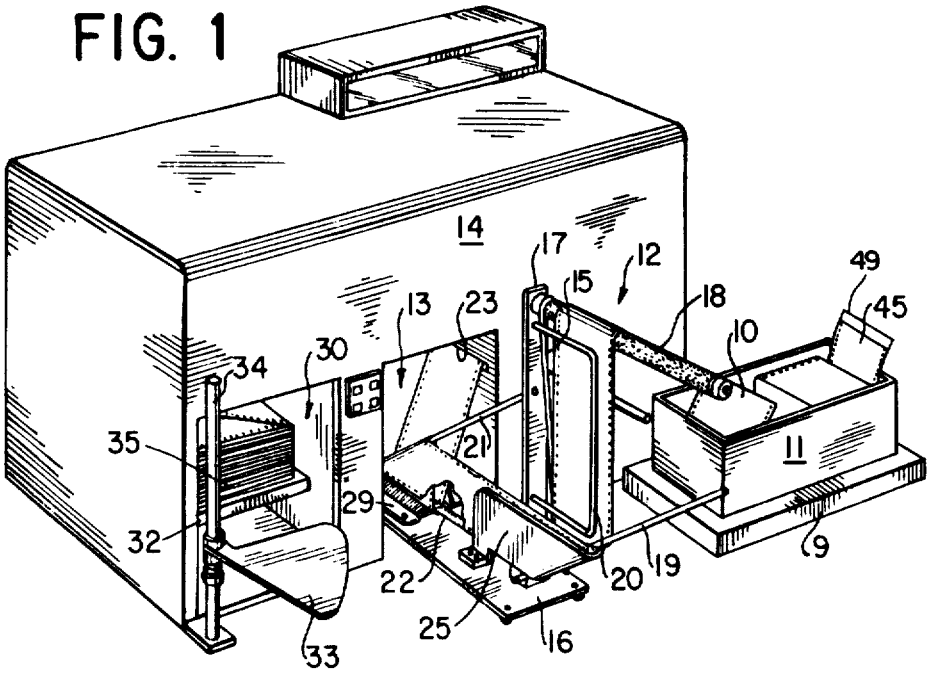
FIG. 1 is a perspective of a web processing machine with the apparatus of the invention positioned adjacent thereto.
Figure 2:
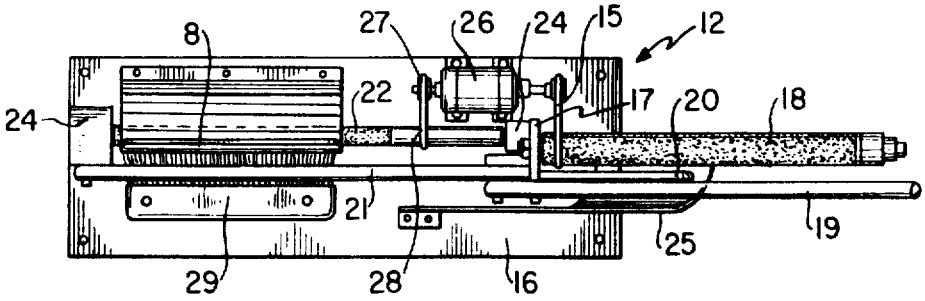
FIG. 2 is a plan view of the web feeding and tensioning unit.
Figure 3:
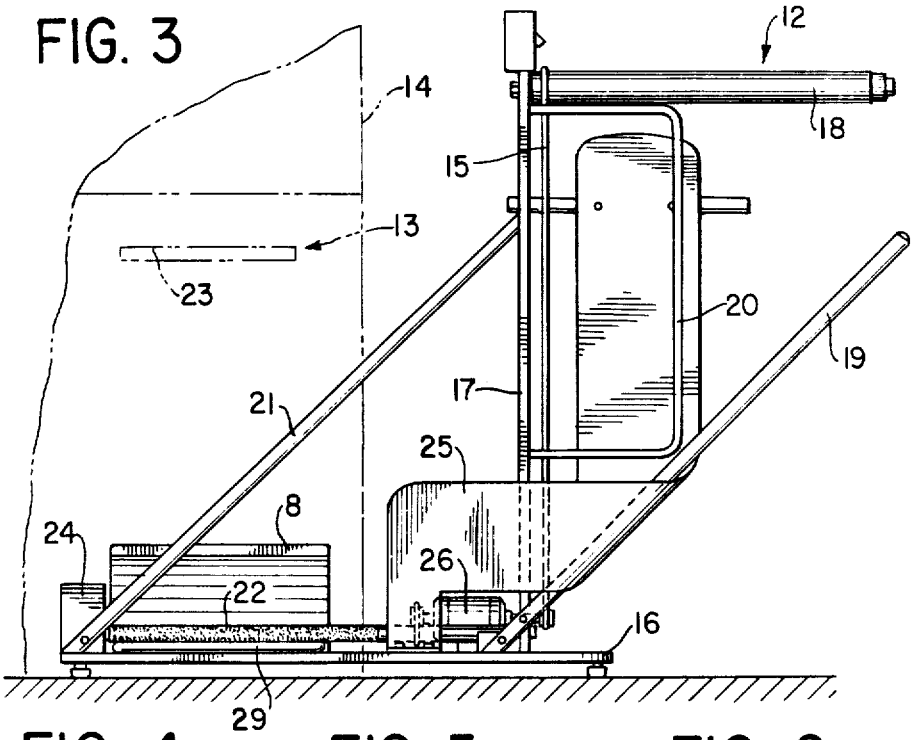
FIG. 3 is a front elevational view of the web feeding and tensioning unit.

Referring to FIGS. 1–3, fan-folded computer printout paper 10 with portions tandemly connected (see FIG. 7) is fed from carton 11 supported on stand 9 to web feed and tensioning device 12 positioned adjacent a recessed area 13 in a high speed printer 14.

The web feed and tensioning device 12 comprises horizontal base 16 having mounted on it a vertical upright 17 which carries a rotably driven horizontal roller 18. Web 10 passes over roller 18 and then downward to a first stationary turn bar 19 mounted on base 16 projecting from the base in a vertical plane on an angle to the base of about 45°. Web 10 is wrapped partially around turn bar 19 causing the web path to be redirected toward and into recess 13. Web 10 is similarly wrapped around a second turn bar 21 causing the web to change its direction downward toward base 16.

The web is then passed around a horizontal driven roller 22 having an abrasive surface to assist along with roller 18 in the moving of the web from the carton 11 through the paths described to the printer feed intake aperture 23. The diameter of drive roll 22, its abrasive surface and its speed are selected to effect sufficient pull on the web being handled so that substantially all forces required to transport the web from carton 11 to roller 22 are supplied by the web unit 12. From a position adjacent roller 22 web 10 is carried over guide plate 8 through intake aperture 23 by action of web moving means located within processing machine 14. Web 10 is guided and stabilized by guides 20 and 25. Brush 29 provides additional control of web 10 in cooperation with roller 22.

Referring in particular to FIGS. 2–3, driven roller 22 is positioned in bearing mounts 24 and driven by motor 26 through pulley-belt 27 which engages roller 22 in a recessed slot 28 in the roller. Pulley-belt 15 positioned on the other output side of motor 26 drives roller [28] *18*.

Figure 4:
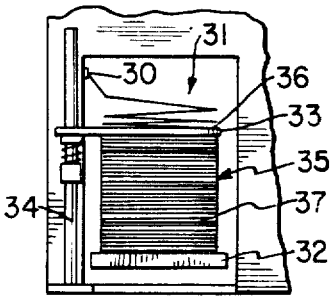
FIG. 4 is a side elevational view of the discharge stack and its support device.
Figure 5:
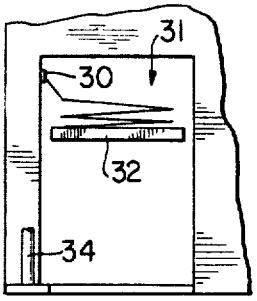
FIG. 5 shows the stack elevator which supports the discharge stack in its upper position.
Figure 6:
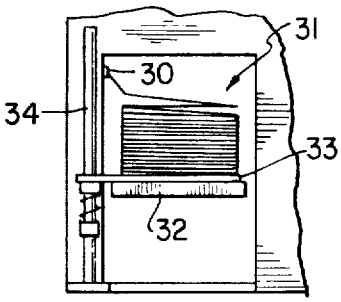
FIG. 6 shows the elevator supporting the stack after removal of a lower portion of the stack.

After web 10 passes through the printer it is discharged out of discharge slot 30 in printer discharge recess area 31 where it falls and fan-folds on a movable elevator platform 32 (FIGS. 4, 5 and 6). Platform 32 is in its upper position as the leading portion of the web first starts to discharge and fan-fold (FIG. 5). As the discharging of the web continues platform 32 moves downwardly in response to the increased weight of the stack. When the stack 35 is nearing the height of recess 31, stack support blade 33 pivotably mounted on plate support stanchion 34 is swung into and inserted in the upper portion of the stack to support the portion of the stack above the plate 33.

The stack is then separated into two portions by slitting along line 36 and the bottom portion 37 of stack 35 lying below and unsupported by plate 33 is removed (FIG. 4). Plate 33 is then swung back to its rest position (FIG. 1) and elevator platform 32 is free to continue to be loaded as before. This process of partial removal of stack 35 is repeated with sufficient speed that the printer need not be stopped for unloading of the discharging web.

Figure 7:
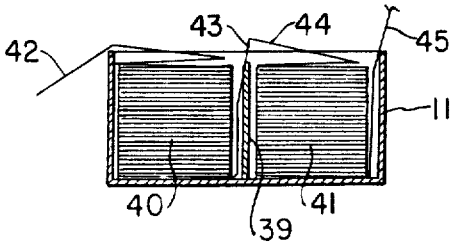
FIG. 7 is a side sectional view of a container holding two web portions.

Turning now to FIG. 7, carton 11 contains stacks of fan-folded web portions 40 and 41 positioned in each side of the divider 39. Stacked web portion 40 has its ends 42 and 43 protruding from the carton and likewise web portion 41 has its ends 44 and 45 protruding for ease in splicing one end to another to form a continuous web from the two web portions. A plurality of cartons, each including one or more web portions, can be arranged for such tandem splicing in this manner. For example, stand 9 may be elongated and equipped with rollers (not shown) to facilitate movement of tandemly arranged cartons 11. Any suitable splicing means may be used such as splicing tape *49*.

We claim:

1. An apparatus for continuously feeding a series of web portions to a high speed web processing machine having web intake and discharge apertures each located in a recessed area of the machine and intermittently removing processed web portions in stacked form from said machine without requiring the web processing to be interrupted comprising (a) web portion alignment and splicing means exterior of the machine for aligning web portions in tandem relationship for splicing;

(b) turn bar means for changing the direction of web travel from the path determined by splicing to successive paths toward and within the intake recess of the machine and thereafter in a path through the intake aperture;

(c) driving and tension control means for controllably driving the web from the alignment and splicing means to a position adjacent the intake aperture which driving and control means in turn comprise (i) a driven roll for contacting the web, said roll having a surface capable of engaging the web with sufficient force to substantially assist in pulling the web from the alignment and splicing means to a position adjacent the intake aperture with the remainder of the force required for web movement being supplied by an internal web moving means located within said web processing machine; and (ii) drive means for driving the driven roll;

(d) movable stack support means positioned adjacent said web processing machine which support means is readily movable into the discharge web stack to support an upper portion of the stack permitting removal of a lower portion of stack and said support means being movable out of the stack to allow the upper portion to move down into space left by the removed stack portion.

2. The apparatus of claim 1 in which the aligning and splicing means includes a support platform and a plurality of tandemly-arranged containers each containing a web portion packed with both ends of the web portion protruding from the container to facilitate splicing the web ends to other web ends.

3. The apparatus of claim 1 in which the turn bar means includes a roller perpendicular to the path of the web during alignment and splicing, two stationary angled turn bars for turning the direction of the web toward the intake recess of the machine and further turning the direction of the web within the recess.

4. The apparatus of claim 1 in which the driving and tension control means includes web guides and web engaging tension means.

5. A process for continuously feeding spliced web portions to a web processing machine and thereafter intermittently removing a series of web portions from a discharge stack of said machine without stopping the web processing comprising (a) placing one or more web portions in containers with the web ends of each web portion protruding from the container;

(b) aligning in tandem relationship a plurality of such containers adjacent said web processing machine;

(c) splicing the ends of two or more web portions together;

(d) causing the spliced web to move in the path determined during splicing and thereafter to change direction toward and into said processing machine; and (e) intermittently removing portions of the discharge stack of the web by temporarily supporting the upper portion of the stack while removing the lower portion.

6. The process of claim 4 in which the step of causing the spliced web to move includes causing the web to pass over a driven roller, a plurality of turn bars and a friction web drive roller.

*7. An apparatus for continuously feeding a series of web portions to a high speed web processing machine having a web intake aperture located in a recessed area of said processing machine, comprising*

*(a) web portion alignment and splicing means exterior of said processing machine for aligning web portions in tandem relationship for splicing;*

*(b) turn bar means for changing the direction of web travel from a path determined by splicing to successive paths toward and within said intake recess of said processing machine and thereafter in a path through said intake aperture; and*

*(c) driving and tension control means for controllably driving said web from said alignment and splicing means to a position adjacent said intake aperture, which driving and tension control means, in turn, comprises*

*(i) a driven roll for contacting said web, said driven roll having a surface capable of engaging said web with sufficient force to substantially assist in pulling said web from said alignment and splicing means to a position adjacent said intake aperture with the remainder of the force required for web movement being supplied by an internal web moving means located within said processing machine; and*

*(ii) drive means for driving said driven roll.*

*8. The apparatus of claim 7 in which said aligning and splicing means includes a support platform and a plurality of tandemly-arranged containers each containing a web portion packed with its forward and rearward ends protruding from said container to facilitate splicing a rearward end of one web portion to a forward end of the next web portion.*

*9. The apparatus of claim 7 in which said turn bar means includes a roller disposed perpendicular to the path*

*of movement of said web during alignment and splicing, and a pair of stationary angled turn bars for changing the direction of said web from said path toward said intake recess of said processing machine and further changing the direction of said web within said intake recess.*

*10. The apparatus of claim 7 in which said driving and tension control means includes web guide and web engaging tension means.*

*11. A process for continuously feeding spliced web portions to a web processing machine, comprising*

*(a) placing at least one web portion in a container in a manner that the forward and rearward end of each web portion protrudes from said container;*

*(b) aligning in tandem relationship a plurality of said containers adjacent said web processing machine;*

*(c) splicing the ends of two or more web portions together; and*

*(d) causing said spliced web portions to move as a continuous web along the path determined during splicing and thereafter changing the path of movement toward and into said processing machine.*

*12. The process of claim 11 in which the step of causing said spliced web portions to move includes causing said continuous web to pass over a driven roller, a plurality of turn bars and a friction web drive roller.*

* * * * *